| (12) | United States Patent | (10) Patent No.: | US 11,186,407 B2 |
|---|---|---|---|
| | Graf | (45) Date of Patent: | Nov. 30, 2021 |

(54) SINGLE-USE BEVERAGE BARREL MADE OF STAINLESS STEEL

(71) Applicant: COOL-SYSTEM KEG GMBH, Fürth (DE)

(72) Inventor: Gerd-Albrecht Graf, Fürth (DE)

(73) Assignee: COOL-SYSTEM KEG GMBH, Fürth (DE)

( * ) Notice: Subject to any disclaimer, the term of this patent is extended or adjusted under 35 U.S.C. 154(b) by 0 days.

(21) Appl. No.: 15/773,801

(22) PCT Filed: Mar. 31, 2016

(86) PCT No.: PCT/EP2016/057129
§ 371 (c)(1),
(2) Date: May 4, 2018

(87) PCT Pub. No.: WO2017/076517
PCT Pub. Date: May 11, 2017

(65) Prior Publication Data
US 2018/0319532 A1    Nov. 8, 2018

(30) Foreign Application Priority Data

Nov. 6, 2015  (DE) .................. 10 2015 014 276.3

(51) Int. Cl.
*B65D 39/00*    (2006.01)
*B65D 8/00*    (2006.01)
(Continued)

(52) U.S. Cl.
CPC ............ *B65D 7/045* (2013.01); *B23K 26/262* (2015.10); *B23K 26/28* (2013.01); *B65D 7/38* (2013.01);
(Continued)

(58) Field of Classification Search
CPC .................. B23K 26/28; B23K 26/262; B67D 2001/0822; B67D 1/0829; B67D 1/0832;
(Continued)

(56) References Cited

U.S. PATENT DOCUMENTS 1,095,014 A * 4/1914 Wentling ............... B21D 39/20
72/370.08
2,057,346 A * 10/1936 Reed ..................... B65D 7/045
220/592.19
(Continued)

FOREIGN PATENT DOCUMENTS

DE        10138365 A1    2/2003
DE    202014009365 U1    2/2015
(Continued)

OTHER PUBLICATIONS

Canadian Office Action, Application No. 3003204, dated Mar. 13, 2019, 5 Pages.
(Continued)

*Primary Examiner* — Charles P. Cheyney
(74) *Attorney, Agent, or Firm* — Lucas & Mercanti, LLP; Klaus P. Stoffel (57) ABSTRACT

A single-use beverage barrel for one-time use, produced from a primarily cylindrical casing part, deep-drawn bottom and lid parts, having an opening in the center of the lid part, which is sealed by a plastic fitting and wherein the casing part is produced from stainless steel and has a wall thickness of 0.8 mm or less and the bottom part and the lid part are also produced from stainless steel and have a wall thickness of 0.8 mm or less.

19 Claims, 6 Drawing Sheets

(51) Int. Cl.
  *B23K 26/28* (2014.01)
  *B65D 6/32* (2006.01)
  *B23K 26/262* (2014.01)
  *B67D 1/08* (2006.01)
  *B23K 101/12* (2006.01)
  *B23K 103/04* (2006.01)

(52) U.S. Cl.
  CPC ......... *B67D 1/0829* (2013.01); *B67D 1/0832* (2013.01); *B23K 2101/125* (2018.08); *B23K 2103/05* (2018.08); *B67D 2001/0822* (2013.01)

(58) Field of Classification Search
  CPC .. B65D 7/38; B65D 7/045; B65D 7/22; F17C 2203/0643
  USPC ......... 222/400.7; 220/632, 581, 592.19, 4.04
  See application file for complete search history.

(56) References Cited

U.S. PATENT DOCUMENTS

| | | | | | |
|---|---|---|---|---|---|
| 2,243,164 | A * | 5/1941 | Maddock | ............... | B65D 7/045 285/221 |
| 2,686,610 | A * | 8/1954 | Sharpnack | ............. | B65D 7/045 220/4.04 |
| 3,456,831 | A * | 7/1969 | Johansson | ................ | C21D 7/12 220/581 |
| 3,729,812 | A * | 5/1973 | Thomas | ................. | B21D 51/20 228/155 |
| 4,093,124 | A * | 6/1978 | Morane | ................. | A61M 11/02 239/327 |
| 4,537,329 | A * | 8/1985 | Norton | ............... | B29C 63/0082 220/661 |
| 4,972,568 | A * | 11/1990 | Schurr | ................... | B21D 51/40 220/601 |
| 5,071,028 | A * | 12/1991 | Murphy | ................... | B65D 7/42 220/4.04 |
| 5,551,590 | A * | 9/1996 | Mazur | ..................... | F24H 9/124 220/23.83 |
| 5,667,253 | A * | 9/1997 | Jansen | .................. | B67D 7/344 285/26 |
| 6,196,277 | B1 | 3/2001 | Till | | |
| 6,425,502 | B1 * | 7/2002 | Rauworth | ............ | B67D 7/0288 222/400.7 |
| 7,168,596 | B2 * | 1/2007 | Delbarre | ................ | B65D 11/08 137/212 |
| 7,806,151 | B2 * | 10/2010 | Hennen | ............... | B65D 51/1683 141/65 |
| 8,181,814 | B2 * | 5/2012 | Awane | ................... | B65D 7/045 220/619 |
| 8,328,240 | B2 * | 12/2012 | Stone | ..................... | F16L 41/14 285/139.1 |
| 8,371,469 | B2 * | 2/2013 | Takedutsumi | ......... | B65D 77/06 220/495.05 |
| 8,870,037 | B2 * | 10/2014 | Takanohashi | ...... | B65D 39/0052 222/400.7 |
| 8,899,452 | B2 * | 12/2014 | Takanohashi | ........ | B67D 7/0288 222/400.7 |
| 9,080,725 | B2 * | 7/2015 | Lai | ........................... | F16J 12/00 |
| 10,495,116 | B2 * | 12/2019 | Benettolo | ................. | F15B 1/10 |
| 2004/0173624 | A1 * | 9/2004 | Carter | .................... | F24D 3/1008 220/720 |
| 2006/0290137 | A1 * | 12/2006 | Benettolo | ............. | F16L 41/082 285/204 |
| 2007/0246446 | A1 | 10/2007 | Lee | | |
| 2011/0226781 | A1 * | 9/2011 | Walser | ...................... | F17C 1/02 220/581 |
| 2011/0253727 | A1 * | 10/2011 | Petzendorfer | .......... | F17C 1/00 220/581 |

FOREIGN PATENT DOCUMENTS

| | | |
|---|---|---|
| GB | 2480671 A | 11/2011 |
| RU | 2323265 C1 | 4/2008 |
| WO | 9208656 A1 | 5/1992 |
| WO | 9209489 A1 | 6/1992 |
| WO | 2004089807 A2 | 10/2004 |

OTHER PUBLICATIONS

Russian Office Action, Application No. 2008118655 dated Mar. 31, 2019, 2 Pages.
Canadian Office Action dated Jan. 30, 3030, Application No. 3003204, 7 Pages.

* cited by examiner

SINGLE-USE BEVERAGE BARREL MADE OF STAINLESS STEEL

CROSS-REFERENCE TO RELATED APPLICATIONS

The present application is a 371 of International application PCT/EP2016/057129, filed Mar. 31, 2016, which claims priority of DE 10 2015 014 276.3, filed Nov. 6, 2015, the priority of these applications is hereby claimed and these applications are incorporated herein by reference.

BACKGROUND OF THE INVENTION

The invention is directed to a one-way beverage barrel for carbonated beverages, in particular for beer and beer-based mixed drinks.

Reusable barrels made of stainless steel with content capacities of between 20 and 50 liters are known in the art. These containers comprise two deep-drawn stainless steel half-shells which are welded in the middle to form a void. A stable standing ring and a handle ring are welded to the outer side of the bottom half-shell and top half-shell, respectively. A fitting is screwed into the top half-shell in the center thereof, a metal riser pipe extending from the fitting to the bottom of the barrel. The standing ring and handle ring are shaped in such a way that the barrels are stackable. By virtue of the deep-drawn half-shells, the barrels can be emptied via the fitting with virtually no residue. With proper handling and maintenance of the fitting, the sturdy construction promises an average service life of 20 years with approximately 60 circulations. With respect to environmental protection, energy use, safety, durability and taste neutrality of the beverage contents, stainless steel barrels have been the first choice of breweries and beverage packagers for decades.

Plastic barrels made of PET have also been in use for the export market for some years. They are appreciably lighter and less expensive than heavy stainless steel barrels. They are designed to be filled once only and need not be transported back to the packager or cleaned. Therefore, when transported over long distances and in markets with higher loss ratios, there are certainly cost advantages over a conventional reusable beverage barrel made of stainless steel.

However, plastic barrels also have disadvantages. At high ambient temperatures, the internal pressure often exceeds the allowable operating pressure of a maximum of 3.5 bar. While the bursting pressures of the barrels are higher at approximately 9 bar, the volume expansion at higher pressures and temperatures is substantial and is not suited for carbonated beverages such as beer; that is, during a volume expansion of the plastic bubble, carbon dioxide passes irreversibly out of the beverage into the created void and leaves the beverage flat. With containers made of plastic, it may happen that the bursting barrel shell flies apart into individual pieces in a life-threatening manner. In some countries, this hazard potential has already led to a prohibition against plastic barrels. In principle, PET containers must be protected against light through additional measures. Sensory tests also showed plastic additives such as plasticizers in the beverage which diffuse into the beverage from the shell. Another criticism is the relatively high permeability of the PET shells to carbon dioxide and oxygen. In this case, special measures must be taken to reduce this. Either the PET material is post-treated to reduce the diffusion, or a separate foil bag is installed inside the plastic bubble. The foil bag in turn comprises a multilayer foil in which a separate aluminum seal is integrated. The shelf life of a premium beverage in a plastic enclosure is shorter than the holding time in a standard stainless steel container.

Another commonly used container type is one-way beverage cans made of tinplate. These small three-part barrels comprise a longitudinally welded, expanded casing part and a bottom part and top part. The three component parts are connected to one another by means of flanged seams so as to be gas-tight and pressure-tight. The inner surface of the receptacle is additionally sealed with a lacquer coat. The cans are filled through a central opening in the top part. The opening is subsequently closed by an elastic plug. Tapping is carried out either via a tap faucet made of plastic which is pressed into the casing part or through the opening in the top part. A riser pipe is not provided. Five-liter cans which are mostly sold to end consumers are used primarily. Use for commercial drink serving is not feasible because the volume capacity is too small. Attempts to make these so-called party barrels bigger for commercial use have not been successful. In particular, the required pressure stability at high temperatures and harsher environmental demands in the export market could not be ensured in a lasting manner. Moreover, tinplate tends to corrode at the weld seams and cut edges. It is not possible to connect to professional dispensing equipment.

Attempts to market a one-way barrel comprising a galvanized sheet steel shell and an inner foil bag have also failed. One of the problems in this combination is leakage where the foil bag connects to the fitting and the sheet steel shell.

SUMMARY OF THE INVENTION

The object of the invention is an economical, sterile one-way beverage barrel which avoids the drawbacks of currently known single-use solutions.

The use of stainless steel, particularly SAE 304 stainless steel, meets all of the requirements for a beverage barrel. Stainless steel is tight against oxygen and carbon dioxide, impermeable to light and is taste-neutral. It can be sterilized at high temperatures and is sufficiently burst-proof even with thin plate thicknesses of less than 0.3 mm. At impermissible overpressure, a weld seam opens via which the overpressure is safely reduced.

In contrast to PET, the use of stainless steel allows barrels to be used within a wide range of temperatures. The barrels remain dimensionally stable and functionally reliable between 40° C. and 80° C.

The barrel casing is longitudinally welded by laser welding technique to form a cylinder. Advances in welding technology make it possible for thin stainless steel sheets to be butt welded, i.e., welded without overlapping each other. According to the invention, the barrel casing made of stainless steel sheet with wall thicknesses of only 0.25 mm can be tightly welded. Accordingly, in particular, the casing part can also have a wall thickness of only 0.3 mm or less. Additionally, the longitudinally welded cylinder can be bulgy-shaped in an expansion process and prepared at the front sides for welding.

While it is possible in principle to secure the bottom part and top part to the cylindrical casing part by crimping, it is preferable in accordance with the invention to weld and, without limiting generality, the following description will usually refer to a welding or weld seam by way of example.

The bottom part and top part which are deep-drawn from stainless steel sheet with a thickness of 0.8 mm or less are placed on the two cylinder ends and welded thereto. Prior to this work step, the three component parts can be sterilized in a known manner. This is carried out either in a thermal process or by means of known cleaning agents. Known sterilization methods such as thermal treatments by application of steam to the interior or by means of steam disinfectant mixtures (e.g., high-percentage hydrogen peroxide solutions) can also be carried out after the metal parts have been assembled.

The three stainless steel parts can advantageously be welded by laser. Using stainless steel instead of tinplate makes it possible to produce weld seams which withstand internal pressures of up to 15 bar even with very thin sheet thicknesses. In principle, the deep-drawn bottom part and top part can be used with concavity facing inward or outward. When the concavity faces inward, the casing part must be cut higher in a corresponding manner in order to allow for the same filling capacity. However, this variant has the advantage that the fitting and tap head, respectively, are better protected by the higher line of the casing. A further advantage consists in that the handle ring can be shorter and, therefore, less costly or, when the height of the casing is sufficient, can be entirely dispensed with. With a well-chosen embodiment form, the top part and bottom part can be produced with one and the same deep-drawing die in some cases.

When the bottom part is used with its curved portion protruding inward, the riser pipe must be correspondingly shaped so as also to reach the deepest point which, for technical reasons, is now located in the area of the surrounding weld seam rather than in the center of the barrel bottom. According to the invention, the riser pipe is not formed by a metal pipe but rather by a flexible hose which is arranged in a self-sealing manner on a spout in the fitting and, owing to its flexibility, is drawn into the deepest region of the bottom part. The flexible hose can be made of food-safe plastics such as polypropylene or polyamide, for example. Further, the inner diameter of the hose can be selected to be smaller (e.g., 6 to 10 mm) than in known standard barrels because no cleaning of the barrel is provided in which a large diameter of the riser pipe is compulsory.

During the production process, after the fitting is inserted, the barrel is nitrogen-purged and subsequently preloaded to approximately 1.5 bar with carbon dioxide or another inert gas, for example, nitrogen. In this way, it remains internally sterile and can be filled in any high-speed filling station immediately and automatically. Accordingly, filling speeds of 1.5 dm$^3$/sec can be achieved. If the barrel is sent from the producer to the packager with internal pressure, the tightness and therefore also the sterility of the barrel can be monitored at the filling station simultaneously via a pressure sensor. Moreover, thin-walled barrels in preloaded condition are appreciably less sensitive to shocks during transportation.

The use of stainless steel sheets for one-way barrels had previously been ruled out in technical circles because the higher price of stainless steel is by itself already an obstacle to success. The use of very thin sheets sharply reduces the price disadvantage even compared with galvanized or tinned sheet. A novel welding technique makes it possible to produce thin-walled stainless steel pipe with the required length and stability by means of laser. The material preferred for decades in the beverage industry can now also be used for one-way barrels.

In this case, there is a further cost advantage because, unlike the refillable standard stainless steel kegs, the barrel according to the invention must be produced from two extremely deep drawn half-shells. The bottom part can be inserted into the barrel casing such that the barrel can stand on the weld seam in a stable manner. This does away with the additional standing ring on the bottom that is obligatory in the standard keg. The two weld seams on the barrel according to the invention can simultaneously be configured as bursting protection means. A handle ring made of plastic or metal can be clipped onto the upper weld seam. Its shape can be selected such that the dimensions of the lower weld seam fit into the handle ring so as to allow a reliable stackability. Further, the height of the handle ring made of polypropylene/HDPE or stainless steel is selected such that the fitting, including tap head, does not jut out at the top and is accordingly better protected.

Arrangements which allow stacking by means of molded polystyrene pieces are also advantageous. These molded pieces can be fastened to the top part, e.g., by means of tensioning straps or other known packaging solutions. In large barrels in particular, the fastening can be used at the same time for carrying the barrel.

It is also conceivable within the scope of the invention to fasten, for example, to glue, a standing ring and a head ring to the outer side of the beverage barrel. In particular, this also makes it possible to arrange the bottom part (or top part) from the outer side instead of inserting them as described above. For example, the standing ring and the head ring can be made of plastic and/or can be adapted to one another with respect to geometry such that a plurality of beverage barrels can be stacked one on top of the other in a stable manner. For example, projections of the head ring and/or standing ring can engage in recesses of the standing ring and/or head ring.

The one-way beverage barrel according to the invention is designed to withstand continuous pressure up to at least 6.5 bar. The wall thickness of the cylindrical casing need only amount to 0.25 mm in this case. The deep-drawn bottom part and top part are chiefly made of stainless steel with a thickness of from 0.5 to 0.8 mm. With a barrel diameter of 290 mm, a total height, including handle ring, of less than 600 mm can also be maintained for a filling volume of somewhat more than 30 liters. With this barrel height, the containers still fit under typical commercial bar equipment. Moreover, the relatively narrow diameter of 280 mm allows an optimal loading on standard palettes. When stacking in two to three layers, this geometry offers an optimal loading on trucks and in ship containers. Accordingly, a 30-liter barrel with a diameter of 280 mm is very financially attractive for the export market. But barrel diameters or barrel heights deviating from this, and therefore other barrel volumes, can also be produced according to the invention. In particular, barrel diameters between 130 and 500 mm and barrel heights of up to 800 mm are particularly financially attractive. It is generally preferable for the barrel capacity of the one-way beverage barrel according to the invention to be in the range of from 6 to 50 liters.

The metal scrap value of the one-way barrel according to the invention is relatively high. Accordingly, recycling is also ensured in third world countries without additional administrative requirements.

A fitting is integrated in the top part of the barrel. This component part must also withstand the same pressure demands and temperature demands set for the stainless steel components. According to the invention, the fitting is made of plastic and closes the centrally arranged opening in the top part. The fitting realizes two flow channels simultaneously. On the one hand, it closes the liquid line which extends via a riser pipe from the bottom of the barrel up to the fitting and, on the other hand, it seals a gas line via which carbonic acid is pressed into the barrel for tapping the beverage. Consequently, both openings must seal off the barrel contents in a sterile manner also throughout the entire period of storage and transportation. In order to tap the barrel contents, a snugly fitting tap head is placed on the fitting, and the liquid line can be opened aseptically via the tap head. On the one hand, it must allow the beverage to flow out without forming excessive foam and, on the other hand, must ensure that pressurized gases such as compressed air or carbon dioxide can flow in safely.

According to the invention, the fitting and tap head components are adapted to one another in such a way that the one-way barrel can be filled in a standard filling installation without use of the tap head and can subsequently be emptied safely at a professional tapping installation using the tap head. Consequently, the tap head has ⅝-inch gas connections and liquid connections which can be reduced to ½ inch by means of adapters. An arrangement with ½-inch connections and ⅝-inch adapters is also optionally possible. In this way, the barrel can be connected to virtually any tapping equipment worldwide.

According to the invention, the tap head can be placed on the fitting and locked to it. In this way, the sealing means in the flow channels are also protected at the same time against contamination and unintentional opening. A suitably arranged seal can indicate this unopened condition. In order to tap the contents, the gasket seal must first be removed or damaged. By rotating the tap head on the fitting, the sealing means of the liquid line can be opened and closed again. When the hose lines at the connections to the tap head are removed and the tap head is simultaneously rotated into the open position, the barrel can be depressurized.

There are ultimately numerous possible solutions for opening and closing the flow channels of the tap head by means of a rotational movement of the tap head and the resulting effect on the fitting.

According to the invention, it can be brought about by means of suitably installed safeguards or locks that the barrel is depressurized and the fitting is irreversibly damaged when the tap head is willfully removed from the fitting. This prevents unauthorized refilling of the barrel. Since by nature of its construction (remaining residual contents, etc.), the barrel excludes cleaning and sterile refilling, this safety measure is advisable and, for some applications, necessary.

The connection of the fitting in the top part can be carried out, according to the invention, via an elastic sealing ring which is clamped between metal and plastic fitting. For this purpose, a socket which snugly receives and simultaneously fixes the fitting can be welded to the opening in the top part. To this end, the socket can be welded to the opening in the top part so as to be gas-tight by means of projection welding or another known welding method.

Alternatively and preferably, however, it is also conceivable to insert the socket into an opening of the top part from the inside before connecting the top part and the casing part or bottom part. To this end, the socket advisably has a circumferential stop surface which contacts the inner side of the top part and which can be realized by means of a protruding profile portion. A sealing element, for example, a sealing ring or a sealing element which is arranged by vulcanization on the stop surface, can be provided between the stop surface and the inner side of the top part and/or as a corresponding formation of the stop surface. In an advantageous manner, the stop surface is pressed against the inner side of the top part more firmly as the internal pressure increases so that an improved seal results at higher pressure. Further, the socket advisably has a cylindrical portion projecting outward from the opening. An external thread can be provided at the cylindrical portion allowing the socket to be fixed after inserting from the outside using a fixing part, for example, a nut, with a corresponding mating internal thread.

Finally, it is also possible in a particularly advantageous manner to dispense with a socket entirely and to insert the fitting into an opening of the top part from the inside even before connecting the top part and casing part or bottom part. In this regard, it is preferable that the fitting has a circumferential stop surface contacting the inner side of the top part. The stop surface can be realized by means of a protruding profile portion. A sealing element, for example, a sealing ring or a sealing element which is arranged by vulcanization on the stop surface, can be provided between the stop surface and the inner side of the top part and/or as corresponding formation of the stop surface, particularly as sealing lip. With an increase in internal pressure such as has already been described referring to the socket, the sealing element is pressed against the top part so that the tightness increases as the internal pressure increases. The fitting also preferably has a substantially cylindrical outwardly projecting portion which projects out of the top part outward through the opening. An external thread, for example, a M36 thread, which makes it possible to prevent the fitting from falling out with a nut having a corresponding internal thread can be provided at the projecting portion. Alternative fastening variants, for example, a pin or glue, are also conceivable. The socket and a method step for inserting the fitting into the socket can then be dispensed with in an advantageous manner, which renders production appreciably simpler and more economical. Further, as a result, this prevents misuse: the fitting can only be dismantled by destroying the barrel.

The arrangement with a fitting inserted from the inside can be realized in a particularly simple and preferred manner in technical respects relating to production when the casing part and the top part are welded by laser. In so doing, the laser as welding source is moved (instead of the put-together shell construction), for example, by means of a robot.

After the fitting which has been aseptically pretreated beforehand has been inserted into the socket, the latter is correspondingly deformed or compressed in order to impart the required pressure-tightness to the fitting. The aseptic pretreatment can be carried out, for example, by briefly placing the fitting together with the (riser) hose in a disinfecting bath of 3-% hydrogen peroxide solution. Unlike plastic parts, stainless steel parts can also be thermally pretreated. For this purpose, the metal component parts which have not yet been welded are exposed to temperatures greater than 85° C. Industrial sterilization of the fully assembled one-way barrel by thermal treatment, application of steam to the interior or by means of a steam disinfectant mixture (high-percentage hydrogen peroxide solution) can also be carried out, according to the invention, through the fitting after all of the parts have been assembled.

Consequently, the one-way beverage barrel according to the invention comprises a three-part stainless steel receptacle and an opening which is closed by the fitting and which is made of plastic, for example, polypropylene. The fitting further contains two mutually independent sealing means for the two flow channels for liquid and gas. The beverage barrel is filled at a conventional filling station. For this purpose, the beverage barrel is pressed headfirst onto an adapter which can mechanically open at least one of the two flow channels in the fitting.

According to the invention, the casing part can also be reinforced by corrugations. In order to achieve a high packing density on palettes, the corrugations face inward. Technically, a bulging expansion of the casing part is not compulsory. Functionally, the barrel need only withstand the pressing pressure of the filling equipment. Pressing pressures of up to 10,000 newtons are customary within the industry. The corrugation structure or the selected expansion shape must withstand these axial forces. In filled condition, the one-way beverage barrel must withstand a continuous internal pressure of 6.5 bar and a temporary internal pressure of 7 bar at temperatures of up to 60° C.

BRIEF DESCRIPTION OF THE DRAWING

Further advantages and particulars of the present invention emerge from the embodiment examples described in the following and referring to the drawings. The drawings show.

DETAILED DESCRIPTION OF THE INVENTION

Figure 1:
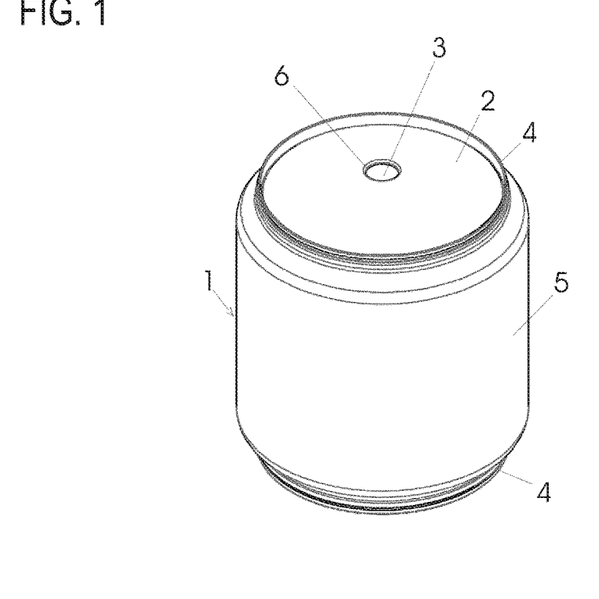
FIG. 1 a one-way beverage barrel according to the invention in a first embodiment form.

In the drawing, FIG. 1 shows a one-way beverage barrel 1 according to the invention made of stainless steel viewed obliquely from above. It comprises a longitudinally welded cylindrical casing part 5 which is expanded and pre-shaped at both front sides for a weld seam 4. The greatest diameter of the casing part 5 is limited to 290 mm. The casing height can vary depending on the required barrel contents. A height of approximately 600 mm results for a volume of 30 liters. The top part 2 comprises an opening 3 with an extrusion 6 which is drawn inward. A bottom part 7 is not visible from this perspective.

Figure 2:
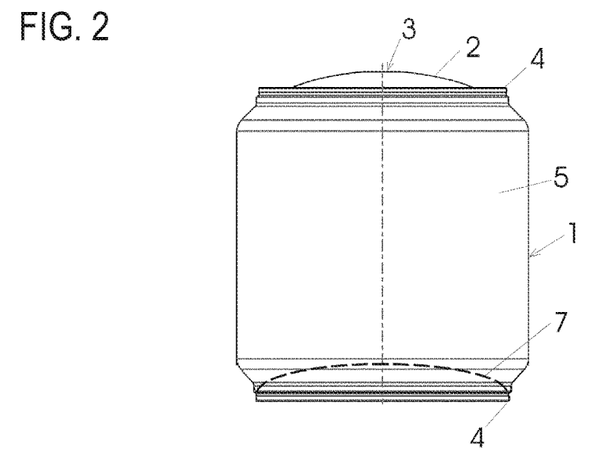
FIG. 2 a side view of the one-way beverage barrel 1 from FIG. 1.

FIG. 2 shows a side view of the one-way beverage barrel 1 from FIG. 1. A bottom part 7 which bulges inward is shown in dashes. It is connected to the casing part 5 in a gas-tight manner through the bottom weld seam 4. The bottom weld seam 4 and/or top weld seam 4 are/is formed in such a way that the one-way barrel 1 is stackable and also withstands improper handling at a high internal pressure. The seams are deliberately designed to give way after an internal pressure of greater than 7 bar and allow the beverage to escape without hazard.

Figure 3:
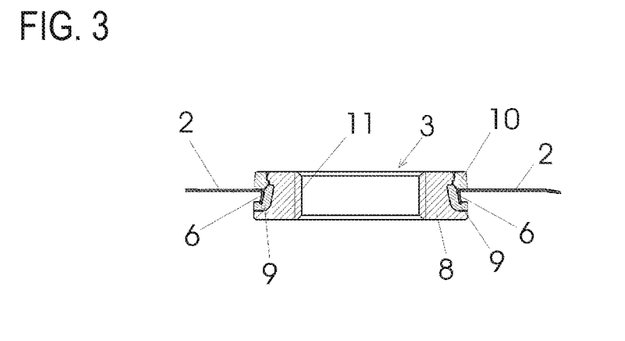
FIG. 3 a detailed solution for screwing in a fitting, not shown.

FIG. 3 shows a detailed solution for screwing a fitting, not shown, into the opening 3 of top part 2 according to FIG. 1. A plastic ring 8 with a snugly fitting sealing ring 9 is pressed into the opening 3 from the inside. The sealing ring 9 is pressed against the extrusion 6 by the internal pressure present in the barrel after filling to realize a gas-tight connection. Without internal pressure, the plastic ring 8 is fixed by means of a clamping ring 10 which is clipped on from the outside. The plastic ring 8 has a threaded opening 11 in the center into which a fitting (not shown) can be screwed. The basic construction of a fitting is explained in more detail referring to FIGS. 6 and 7. In the embodiment form according to FIG. 3, the plastic parts are pretreated aseptically by submerging in a suitable solution prior to the assembly of the barrel. The metal component parts of the barrel have already been thermally sterilized in a known manner prior to the insertion of the plastic parts. For this purpose, they pass through an oven which heats the metal parts to greater than 85° C. up to a maximum of 150° C.

Figure 4:
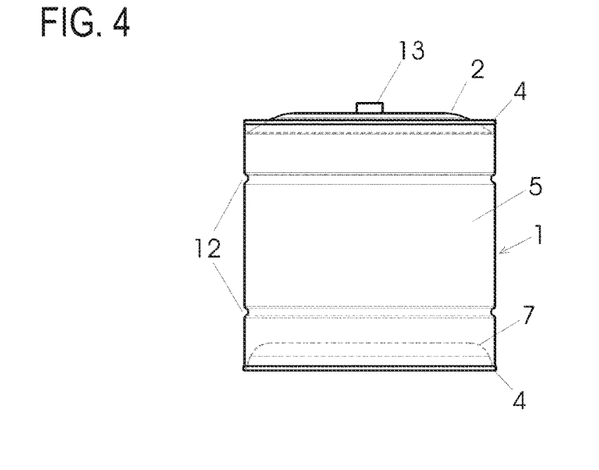
FIG. 4 a second embodiment form of a one-way barrel according to the invention.

FIG. 4 shows another construction of a one-way barrel 1 according to the invention. The cylindrical casing part 5 is not expanded in this case but is stabilized by corrugations 12 facing inward. The corrugations have a spacing of at least 14 cm to provide sufficient space for applying a label. Owing to the larger diameter, the bottom part 7 and top part 2 must be constructed somewhat more ruggedly in this construction. The requirements for the weld seams 4 are also stricter with this geometry. In this version, the opening 3 in the top part 2 is extended far outward in the shape of a socket 13 so as to enable the fitting to be fixed without the plastic ring from FIG. 3. As an alternative to this extrusion, when the top cover material is very thin, a separately produced socket 13 can be welded on or inserted from the inside as will be described more fully in the following referring to FIG. 9. When the socket 13 is welded on, the construction can be carried out quickly, reliably and economically by means of projection welding or by means of laser welding. According to the invention, the fitting can also be injection-molded or cast integrally in the socket 13 already before welding using known production methods.

Figure 5:
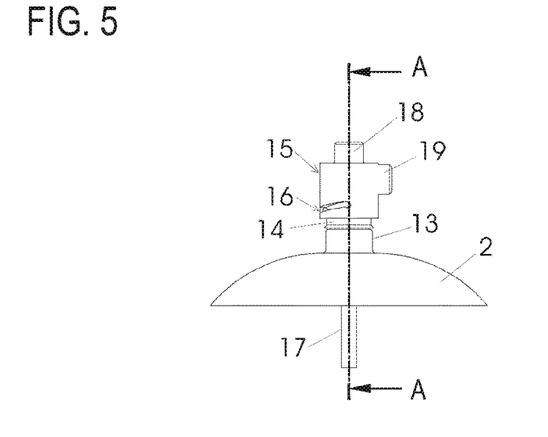
FIG. 5 a socket at a cut-off top part.

FIG. 5 shows a socket 13 which is welded onto a top part 2, shown in a cut-off manner, in which a fitting 14 is installed and to which a tap head 15 is fitted. The tap head 15 is rotatable on the fitting 14 and is axially displaceable by means of a bayonet guide 16, as it is called. A flexible (riser) hose 17, which is only partially depicted in the drawing, extends from the weld area of the one-way barrel into the fitting 14. The tap head 15 has a liquid connection 18 for the beverage and a gas connection 19 for carbon dioxide or other tapping gases. The two connections 18, 19 have a ⅝-inch external thread, a ½-inch external thread or another customized thread for screwing corresponding lines onto a professional dispensing installation. For tapping without $CO_2$ and without using professional dispensing equipment, an air pump, gas cartridge or a compressor with pressure reducing valve is connected to the gas connection 19, and a hose with dispenser is fitted to the liquid connection 18.

Figure 6:
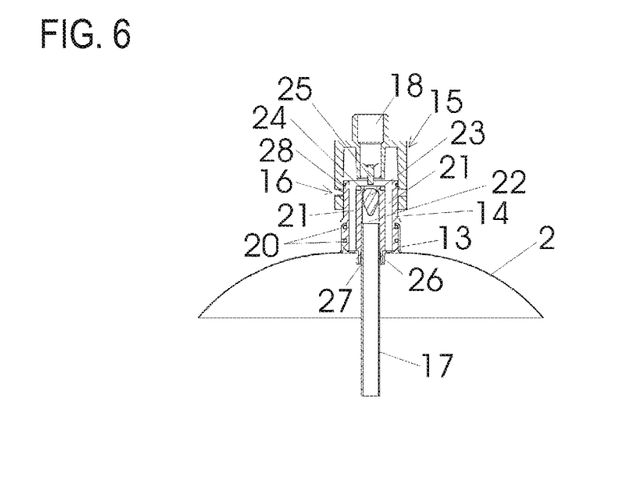
FIG. 6 a sectional view along section line AA in the arrangement according to FIG. 5.
Figure 7:
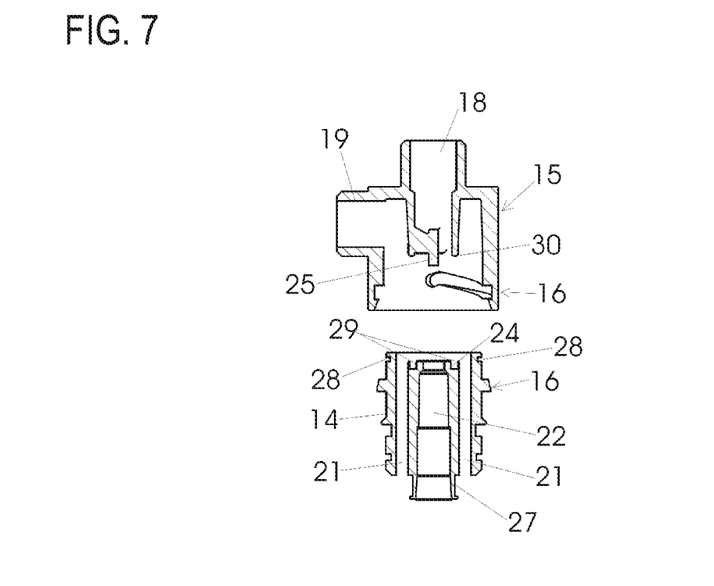
FIG. 7 the tap head and the fitting from FIG. 6 in individual sectional views.

FIG. 6 is a sectional view along section line AA in the arrangement according to FIG. 5. The fitting 14 is fixed in the lower area of the socket 13 and is protected by the tap head 15 in the upper portion. In order to show the details of the tap head 15 and fitting more clearly, the tap head 15 and fitting 14 from FIG. 6 are shown in FIG. 7 in separate sectional views without O-rings or sealing means. Therefore, the designations in FIGS. 5 to 7 refer to the same embodiment form.

The lower portion of fitting 14 is sealed relative to socket 13 by means of two O-rings 20. The socket 13 has been drawn in at the upper end after insertion of the fitting 14 so as to hold the fitting 14 in a pressure-tight manner. A plurality of gas line bores 21 and a central liquid line 22 in which a sealing body 23 can move up and down run through the fitting 14. At the top end point, the sealing body 23 seals the liquid line 22 at the sealing surface 24 of the fitting 14. The upper end of the riser line 17 inserted into the fitting 14 from below forms the bottom contact point of the sealing body 23. Accordingly, the sealing body 23 has sufficient travel to close off the liquid line 22 in the upper position and to keep the liquid line 22 open as wide as possible in the lower position. The tap head 15 is rotated to open the liquid line 22. The tap head 15 moves up or down axially depending on the rotating direction via the bayonet-type guide groove 16. During a movement in direction of the fitting 14, a pin 25 pushes the sealing body 23 downward away from the sealing surface 24. This clears the path for the liquid through the liquid line 22. During a rotation of the tap head 15 in the opposite direction, the pin 25 is pulled upward again and the sealing body 23 is pressed against the sealing surface 24 by the internal pressure in the barrel. According to the invention, this variant solution functions without the metal compression springs required in known solutions.

The sealing means 26 for sealing the gas line is an elastomer which is mounted on a spout 27 at the lower end of the liquid line 22 and seals the gas line bores 21 with its disk-shaped sealing surface. The sealing means 26 are configured to fit tightly on the spout 27 and close the gas line bores 21 even without a difference in pressure. Accordingly, the sealing means 26 work like a check valve which only releases the path into the interior of the barrel when the line pressure is higher than the system pressure in the barrel. In order to seal the individual lines relative to one another and relative to the environment, two further seals are provided. The fitting 14 comprises a circumferential groove 28 for receiving an O-ring which seals the gas line relative to the environment vis-a-vis the lifting and rotating movement of the tap head 15 at the fitting 14. The sealing of the gas line relative to the liquid line 22 is ensured via an annular groove 29 filled with an elastic foam sealant. A suitably shaped mating piece 30 is pressed into the foam sealant when the tap head is lowered.

Figure 8:
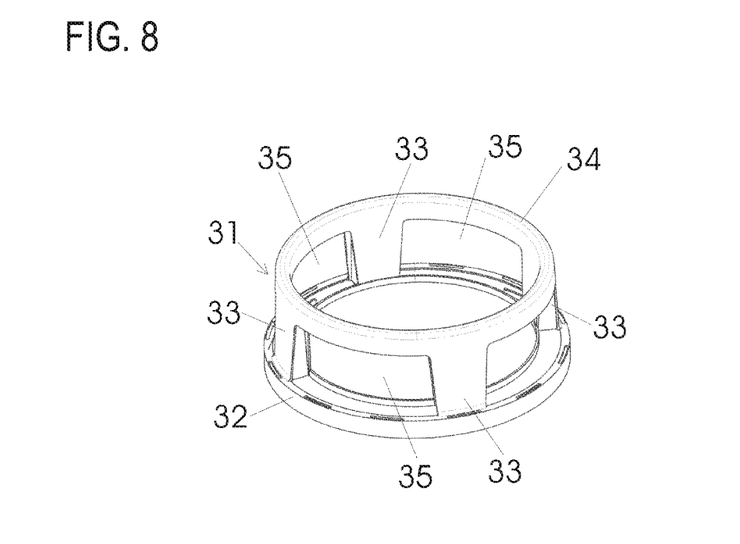
FIG. 8 a handle ring made of plastic viewed obliquely from above.

Finally, FIG. 8 shows a handle ring 31 made of plastic in an oblique top view. A circumferential annular strip 32 can be sustainably glued on in the area of the upper weld seam 4 of a one-way beverage barrel 1 according to FIGS. 1 and 2. A handle strip 34 which likewise extends circumferentially and which is exactly adapted with respect to diameter and shape to the diameter of the lower weld seams 4 of a one-way barrel 1 is formed integrally via four bridges 33. The four cutouts 35 which remain allow a reliable handling of the barrel and afford a reliable support for the hose lines during the tapping period.

To fill the one-way beverage barrel 1, the latter is pressed headfirst without tap head onto an automatically operating filling station and the two flow lines are engaged with the filling station. According to the invention, the barrel can be pretensioned with carbon dioxide or another inert gas. Contrary to the subsequent dispensing process, filling with beverages is carried out via the gas line bores 21 and not via the liquid line 22. The sealing means 26 release the path as soon as the liquid pressure exceeds the internal pressure in the barrel. The gas in the barrel escapes via the (riser) hose and the sealing body 23 in the fitting as soon as the sealing body 23 is forced back by a suitably constructed tool at the filling station. Consequently, the filling of the barrel can also be controlled via the outflow of the gas in the barrel. Accordingly, when the barrels are pretensioned a fully aseptic filling is ensured. A high filling capacity can be achieved with sufficiently dimensioned gas line bores 21. In practice, the one-way beverage barrel 1 is filled volumetrically, i.e., when the required amount of beverage has flowed in, the liquid feed is halted and the barrel is removed from the filling station.

Figure 9:
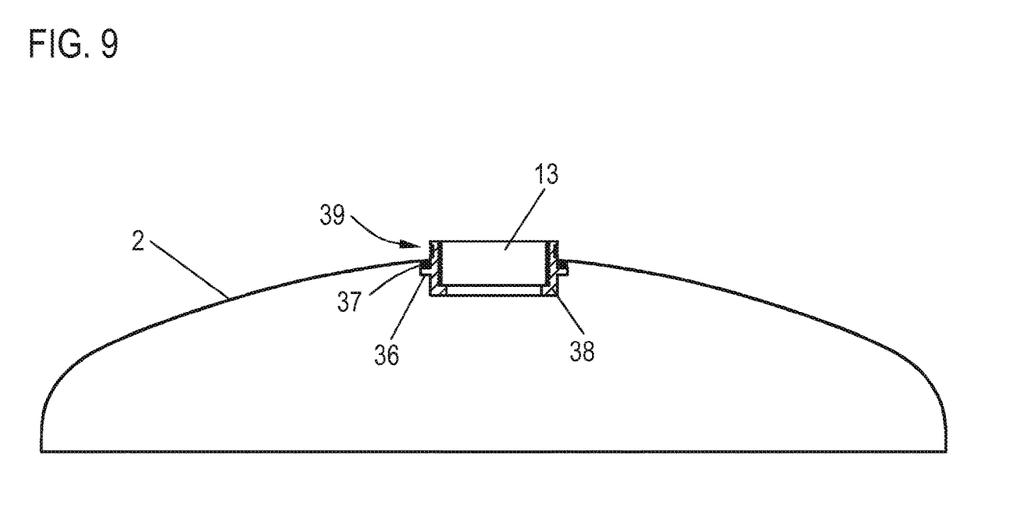
FIG. 9 a top part of a further embodiment form in cross section.

Another embodiment form of a top part 2 is shown in cross section in FIG. 9. It will be seen that the socket 13 is inserted in this case from inside before the top part 2, casing part 5 and bottom part 7 are welded together. To this end, it has a profile portion 36 as stop which defines a stop surface which is pressed under pressure against the interior of the top part 2 by means of a sealing element 37. The cylindrical portion 38 projecting out of the opening in the top part 2 shows an external thread 39 via which the socket 13 can be fastened at least provisionally by means of a fixing part, not shown in more detail, with a corresponding internal thread. Of course, an alternative fastening is also possible, for example, by gluing, at least for a phase during which there is not yet any internal pressure.

Figure 10:
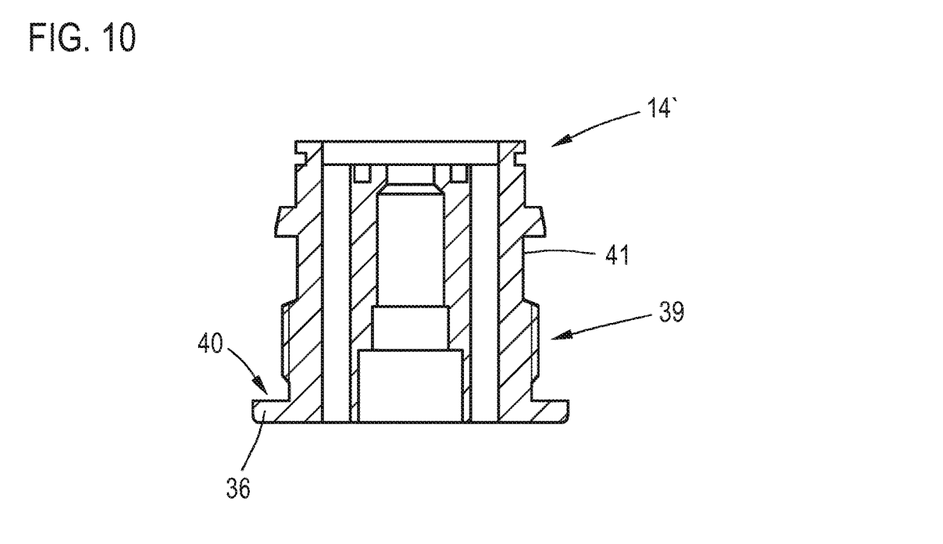
FIG. 10 a fitting of a further arrangement.

Alternatively and in a particularly preferred manner, instead of a socket 13, the fitting 14 can also be inserted directly and by itself into the opening in the top part 2 (see FIG. 9) preferably before the casing part 5 and top part are laser-welded. FIG. 10 shows a correspondingly configured fitting 14. Fitting 14 also has a profile portion 36 defining a stop surface 40 which contacts the inner side of the top part 2 when inserted through the opening. A sealing element 37 (see FIG. 9) can be provided in turn on the stop surface 40 or as part of the stop surface 40.

An external thread 39, in this case an M36 thread, is provided at the substantially cylindrical outwardly protruding portion 41 which projects out of the top part 2 in the inserted state. Via this external thread 39, the fitting 14 can be at least provisionally fastened by means of a fixing part, particularly a nut. This is also possible by means of other fastening means, for example, gluing or by a pin to be inserted through the outwardly protruding portion 41.

After the fitting 14 has been inserted and at least provisionally fastened, the top part 2 and casing part 5 can be put together for welding in which preferably a laser, as welding source, moves around the put-together, upright shell construction. At a later point in time, the stop surface 40 is pressed against the top part 2 owing to the internal pressure so as to create an excellent seal.

Figure 11:
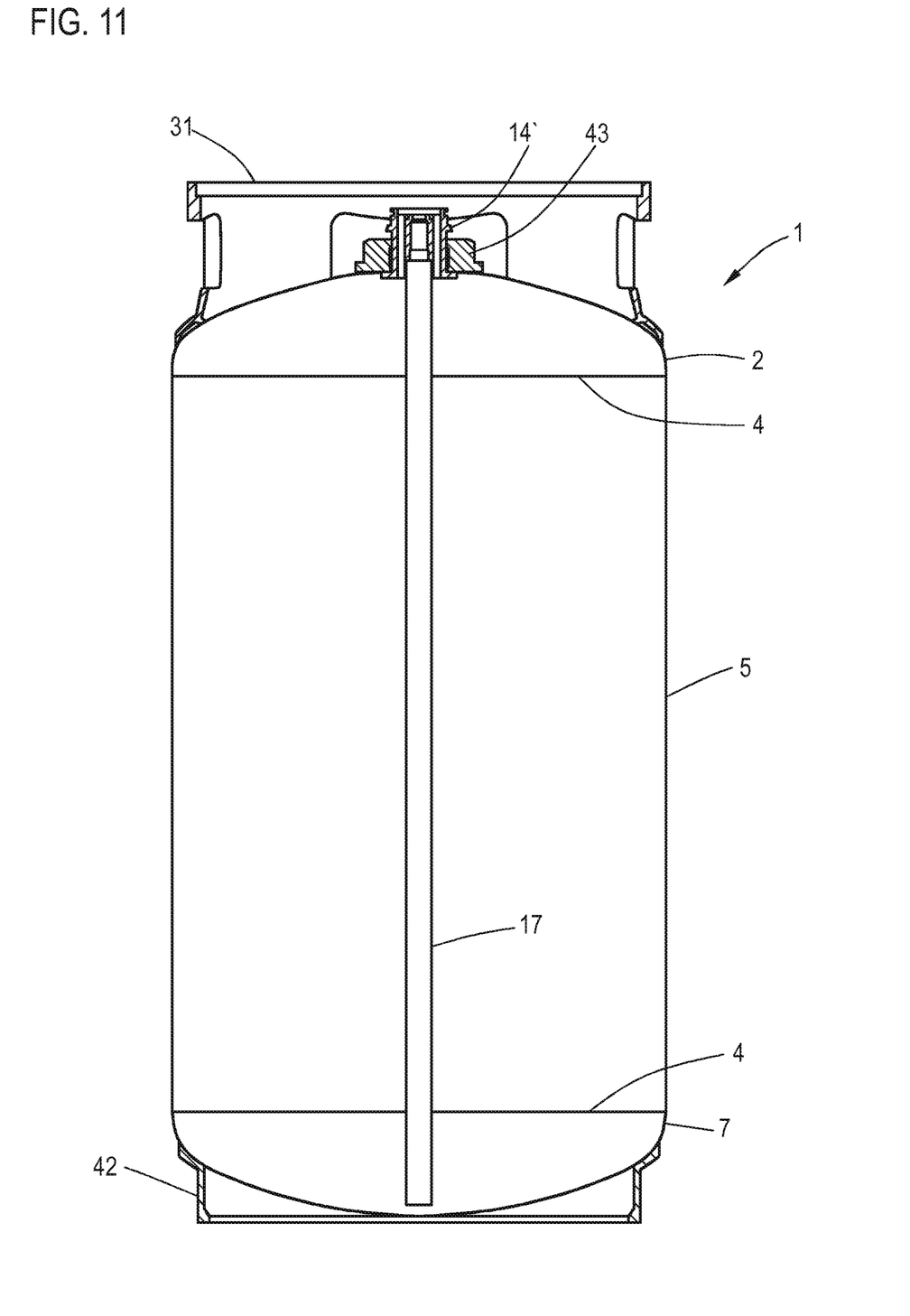
FIG. 11 a third embodiment form of a one-way beverage barrel according to the invention.
Figure 12:
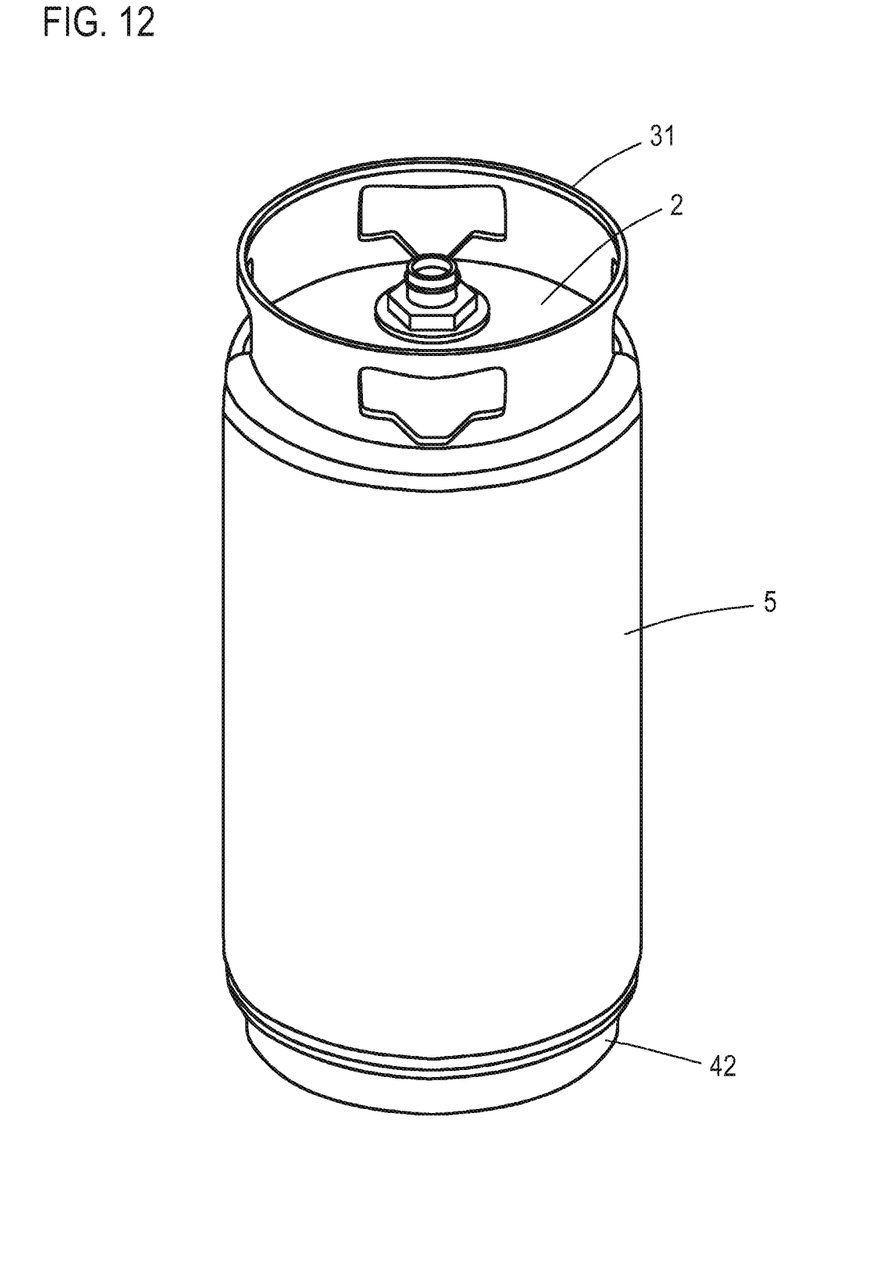
FIG. 12 an exterior view of the one-way beverage barrel from FIG. 11.

Finally, FIG. 11 and FIG. 12 show a third, particularly preferred embodiment form of the one-way barrel 1 according to the invention. The casing part 5 having a thickness of 0.3 mm is welded to the top part 2 and the bottom part 7, each of which has a thickness of 0.5 mm. The use of a standing ring 42 and a head ring formed as handle ring 31, which are adapted to one another, makes it possible not only to stack one-way barrels 1 but also to add on the top part 2 and bottom part 7 from the outside, as was described previously. The connection is again realized via the weld seams 4.

The fitting 14' of FIG. 10 is used. Also shown, in addition, is the fixing part 43 which is formed as a nut, for example, whose internal thread cooperates with the external thread 39. A retainer ring can also be used as fixing part 43.

The individual components and connections of the barrel are configured to remain dimensionally stable and functionally reliable at temperatures between −40° C. and −80° C.

A handle ring or standing ring made of plastic or metal can be fastened to the top part and/or to the bottom part and is shaped in such a way that the beverage barrel is stackable and the fitting is protected against mechanical shocks.

The fitting can comprise a gas line and liquid line which are capable of being shut off.

The fitting can be made at least partially of polypropylene, polyamide or another food-safe plastic and is tightly connected to the top part.

In another embodiment, the cylindrical casing part is expanded.

The casing part can be stabilized by having inward-facing corrugations.

The one-way beverage barrel can also have at least one sealing means arranged such that it is no longer tight after the tap head is removed.

The beverage barrel can further have a flexible hose mounted on the fitting in a self-sealing manner and extending from the fitting into the lowest region of the bottom part.

The invention claimed is:

1. A single-walled beverage barrel produced from a predominantly cylindrical casing part, a deep-drawn bottom part and deep-drawn top part, provided with an opening in the center of the top part, which opening is closed by a plastic fitting, wherein the casing part is produced from stainless steel and has a thickness of 0.8 mm or less, and the bottom part and the top part are likewise made of stainless steel and have a thickness of 0.8 mm or less, wherein the longitudinal seam of the casing part is butt welded by means of laser, wherein the fitting is configured to be insertable into the opening of the top part only from the inside prior to the butt welding of the seam and is further configured to be incapable of removal from the opening without destruction of the barrel, wherein the fitting has a liquid flow channel and a gas flow channel that are each selectively sealable and openable, further comprising a socket welded to the top part, wherein the fitting is tightly injection-molded in the socket.

2. The single-walled beverage barrel according to claim 1, wherein the casing part is welded with the bottom part and the top part such that the material in the immediate vicinity of the longitudinal weld seams or round weld seams is not tight above an internal pressure of 7 bar so as to prevent a higher pressure increase.

3. The single-walled beverage barrel according to claim 1, wherein casing diameter is between 130 mm and 500 mm.

4. The single-walled beverage barrel according to claim 1, wherein the barrel height is less than 800 mm.

5. The beverage barrel according to claim 1, wherein the components coming into contact with the filling are sterilized either by means of a disinfectant solution and/or by a thermal treatment at at least 85° C. to a maximum of 300° C.

6. The beverage barrel according to claim 1, wherein the barrel is pretensioned with an inert gas after sterilization and before filling with beverages.

7. The single-walled beverage barrel according to claim 1, wherein at least one sealing means in the flow channels of the fitting can be opened via an attachable tap head.

8. The single-walled beverage barrel according to claim 1, wherein the fitting is shaped in such a way that at least one sealing means can be opened when fitting to the filling head of a conventional filling installation.

9. The beverage barrel according to claim 1, wherein the fitting is sterilized in a disinfecting bath before inserting into the top part.

10. The beverage barrel according to claim 1, wherein a tap head which can be axially displaced by rotating is mounted on the fitting.

11. The beverage barrel according to claim 10, wherein a pin in the tap head can act on a sealing means of the liquid line.

12. The beverage barrel according to claim 10, wherein the tap head has connections with ⅝-inch or ½-inch external threads.

13. The beverage barrel according to claim 10, wherein the tap head has an arrangement which destroys a lock on the fitting after a violent removal of the fitting.

14. The beverage barrel according to claim 10, wherein the tap head has an arrangement which renders at least one sealing means no longer tight after a violent removal of the fitting.

15. The beverage barrel according to claim 10, wherein the tap head has a gas line and a liquid line.

16. A method for producing a single-walled beverage barrel according to claim 1, wherein the casing part is shaped to form a cylinder for welding by means of laser, and the two sheet sides to be welded are in abutment with one another and maintain a gap width of less than 0.2 mm, wherein a fitting is inserted into an opening of the top part from the inside prior to welding.

17. The method according to claim 16, wherein the top part and bottom part are oriented with respect to the casing part for welding by means of laser such that the gap between the individual parts is less than 0.2 mm.

18. The method according to claim 16, wherein the fitting is inserted into an opening of the top part from the inside before welding the top part and the casing part or bottom part.

19. The single-walled beverage barrel according to claim 3, wherein the casing diameter is between 230 mm and 290 mm.

* * * * *